3,514,426
PROCESS FOR SUPPRESSING MOLECULAR JUMP
Robert E. Barrett, Baton Rouge, La., assignor to Copolymer Rubber & Chemical Corporation, Baton Rouge, La., a corporation of Louisiana
No Drawing. Continuation-in-part of application Ser. No. 569,802, Aug. 3, 1966. This application Mar. 24, 1969, Ser. No. 809,975
Int. Cl. C08c *11/18;* C08f *15/40*
U.S. Cl. 260—41.5                7 Claims

ABSTRACT OF THE DISCLOSURE

In the preparation of sulfur-vulcanizable elastomers by the interpolymerization of ethylene, at least one alpha monoolefin and at least one ethylenically unsaturated monomer containing two or more double bonds and in the presence of a Ziegler type catalyst, the suppression of molecular jump by the admixture of carbon black in amounts of 1–200 parts by weight of carbon black per 100 parts by weight of elastomer.

---

This application is a continuation-in-part of my copending application Ser. No. 569,802, filed Aug. 3, 1966, and entitled, "Process for Suppressing Molecular Jump," now abandoned.

This invention relates to a novel process for preparing sulfur-vulcanizable elastomers by solution polymerization of a monomeric mixture of alpha-monoolefins and an ethylenically unsaturated monomer containing a plurality of carbon-to-carbon double bonds in the presence of a Ziegler polymerization catalyst whereby molecular jump may be suppressed during the subsequent deactivation of the catalyst.

When polymerizing a monomeric mixture including two or more alpha-monoolefins and an ethylenically unsaturated monomer containing a plurality of carbon-to-carbon double bonds in solution in an inert organic solvent and in the presence of a Ziegler catalyst, it has been found that if the resulting cement is contacted with air and/or water in the presence of the active polymerization catalyst, the molecular weight often increases drastically and a crosslinked product of poor processibility is produced. This drastic increase in molecular weight is commonly referred to as molecular jump, and it is especially pronounced when the polymerization catalyst is destroyed by addition of water. Molecular jump results in a less desirable or unsatisfactory elastomeric product and, in view of this, the control of molecular jump is of great importance from a practical standpoint. As a result, the art has long sought an entirely satisfactory process for killing the polymerization catalyst whereby molecular jump may be controlled.

It is an object of the present invention to provide a novel process for preparing sulfur-vulcanizable elastomers wherein molecular jump may be suppressed or prevented.

It is a further object to provide a novel process for polymerizing monomeric mixtures including two or more alpha-monoolefins and at least one ethylenically unsaturated monomer containing a plurality of carbon-to-carbon double bonds in solution in an inert organic solvent and in the presence of a Ziegler polymerization catalyst, whereby the active catalyst in the resulting solution of polymer may be deactivated without encountering a drastic increase in the molecular weight of the dissolved polymer.

It is still a further object of the invention to provide a novel process for polymerizing a monomeric mixture containing ethylene, propylene and a polyene in solution in an inert organic solvent and in the presence of a Ziegler polymerization catalyst, in which the active catalyst in the resulting solution of polymer may be deactivated under conditions whereby molecular jump may be controlled, and thereafter the catalyst residue may be washed from the solution of polymer with water and the polymer recovered from the solvent in the form of crumb having a low ash content.

Still other objects and advantages of the invention will be apparent to those skilled in the art upon reference to the following detailed discussion and the examples.

When deactivating a Ziegler catalyst contained in a solution of elastomer prepared by polymerizing a monomeric mixture of alpha-monoolefins and one or more monomers containing a plurality of carbon-to-carbon double bonds, it has been discovered that molecular jump may be suppressed or prevented entirely by addition of carbon black to the resulting solution of polymer containing the active catalyst. The addition of the carbon black appears to deactivate the growing or "living" polymer chain or otherwise inhibit cationic catalyzed cross linking during normal killing of the catalyst with water or alcohol, either completely or at least to a sufficient extent that molecular jump is no longer a problem when the solution of polymer is subsequently thereto contacted with air and/or a catalyst deactivator, such as water. Thus, it is possible to subsequently add water and intimately admix the water with the solution of polymer for the purpose of washing the catalyst residue therefrom.

Prior art reaction conditions may be used when preparing the solution of polymer to be treated in accordance with the invention. Examples of patents which disclose satisfactory procedures for preparing elastomers from monomeric mixtures of alpha-monoolefins and polyenes include United States Pats. Nos. 2,933,480, 3,093,620, 3,093,621 and 3,211,709, the disclosures of which are incorporated herein by reference. Halogen substituted polyenes and especially chlorine substituted polyenes, or substituted polyenes containing other types of substituents which do not adversely affect the polymerization, may be present in the monomeric mixture to be polymerized. Thus, one or more suitable substituted or unsubstituted monomers in general which contain a plurality of carbon-to-carbon double bonds may be interpolymerized with a mixture of alpha-monoolefins to produce elastomers. Examples of halogenated polyunsaturated monomers are disclosed in United States Pats. Nos. 3,220,988 and 3,222,330. The polymerization procedures disclosed in the above references produce a solution of the elastomer in an organic solvent which contains the active Ziegler polymerization catalyst. The catalyst is deactivated in accordance with the invention prior to recovery of the solid elastomer from the solution.

The carbon black that is added to the solution of elastomer may be commercially available carbon black of the types used for reinforcing rubbery polymers, including the various reinforcing channel carbon blacks and reinforcing furnace carbon blacks. The grades of carbon black used as reinforcing agents in rubbery polymers are discussed by W. R. Smith in "Encyclopedia of Chemical Technology," volume 3, pages 34–65, Interscience Encyclopedia, Inc., New York, N.Y. (1949); by C. W. Sweitzer, in F. Chem., Ed., vol. 29, pages 493–502 (1952); and in the text Synthetic Rubber by Whitby, Editor in Chief, John Wiley and Sons, Inc., New York, N.Y. (1954), the teaching of which are incorporated herein by reference. Examples of specific rubber grade carbon blacks include EPC (Easy-processing channel), MPC (Medium-processing channel), HPC (Hard-processing channel), SRF (Semireinforcing furnace), HMF (High-modular furnace), MAF (Medium-abrasion furnace), or FEF (Fast-extrusion furnace), FF (Fine furnace), VFF (Very fine furnace), RF (Reinforcing furnace), HAF (High-abrasion furnace), CC (Conductive channel), CF (Conductive furnace), MT (Medium thermal), SAF (Super-abrasion furnace), ISAF (Intermediate-super-abrasion furnace), and FT (Fine thermal). The foregoing carbon blacks are normally admixed with ethylene-propylene-diene monomer rubbers, styrene-butadiene rubber, cis-1,4-polybutadiene, cis-1,4-polyisoprene, etc. and used as reinforcing agents. These carbon blacks may be referred to herein as rubber grade carbon black reinforcing agents. The carbon black may be used in the commercially available form without further treatment other than grinding to a finely divided state, if desired.

The carbon black may be introduced into the solution of elastomer by any convenient method. For instance, the carbon black may be ground to a finely subdivided state in a prior art grinding device such as a fluid energy pulverizer (Jet-O-Mizer), or in a mechanical grinder (Micronizer), and the ground dry carbon black may be added to the solution of elastomer with vigorous agitation. If the solution of elastomer is viscous, it may be heated to an elevated temperature to aid in dispersing the carbon black therein. The ground carbon black is preferably added to dry, fresh polymerization solvent so as to form a relatively nonviscous slurry or suspension, and then the slurry is added to the solution of elastomer with vigorous agitation.

The amount of carbon black to be added in a given instance may vary over wide ranges. It is only necessary that enough carbon black be added to suppress or control molecular jump, but much larger quantities may be added when this is desirable. The amount of carbon black may vary from as little as 1, 5, 10 or 20 parts by weight per 100 parts by weight of elastomer, up to 100 or 200 parts by weight per 100 parts by weight of elastomer. Carbon black additions of about 10–100 parts by weight per 100 parts by weight of elastomer are usually preferred. The specific amount of carbon black that is added will usually depend upon the desired carbon black content in the solid elastomer as a carbon black masterbatch is produced. Thus, the present invention provides a unique and highly satisfactory method of producing carbon black masterbatches, as well as suppressing or preventing molecular jump.

After adding the carbon black as discussed above, the solution of elastomer may be thoroughly washed with water to remove catalyst residues. The resulting deashed solution of polymer may be passed to a prior art process for removing the solvent and recovering the solid elastomer in a desired form such as crumb. For instance, the elastomer may be recovered by introducing the solution below the surface of a body of hot water maintained in a coagulation tank to which steam is supplied continuously. The solvent is evaporated and recovered overhead, and the elastomer is recovered in the form of a slurry of crumb. The crumb may be withdrawn, stripped with steam in a second vessel to remove traces of solvent, washed with water to remove any remaining catalyst residue, dewatered, dried by means of a prior art extrusion dryer or an apron dryer, and baled.

The specific monomers and ratios of monomers to be polymerized in accordance with the invention need not differ from those used in the prior art. In many instances, it is preferred that the elastomers be prepared from a monomeric mixture containing ethylene, propylene and a polyene, and the elastomer may contain chemically bound therein molar ratios of ethylene to propylene varying between 80:20 and 20:80, and preferably between 70:30 and 55:45. The polyene may be chemically bound in the elastomer in an amount to provide an actual unsaturation level of not less than about 2 carbon-to-carbon double bonds per 1000 carbon atoms in the polymer chain; however, much higher actual unsaturation levels are possible such as for example, 5, 10, 20, 25, 30, 60, 100 or more carbon-to-carbon double bonds per 1000 carbon atoms in the polymer. The specific unsaturation level that is selected in a given instance will vary depending upon the cure rate and other properties which are desired in the elastomer. The invention is especially useful when preparing polymers containing actual unsaturation levels of about 7–30, and preferably about 10–20, carbon-to-carbon double bonds per 1000 carbon atoms.

For some reason which is not fully understood at the present time, polymers prepared from monomeric mixtures containing ethylene, at least one higher straight chain alpha-monoolefin having 3–16 carbon atoms such as propylene, and certain polyenes such as 5-ethylidene-2-norbornene, have a much more rapid cure rate when cured with sulfur than would be predicted from the actual carbon-to-carbon double bond content. In such instances, the apparently higher unsaturation level is embraced within the term "effective" unsaturation level of the polymer. As is set out in detail hereinafter, the foregoing polymers may be analyzed to determine the effective unsaturation level by the consumption of bromine, correcting for the substitution reaction by a kinetic method based on the spectrophotometric method developed by Siggia, et al., Anal. Chem. 35, 362 (1963). The effective carbon-to-carbon double bond content per 1000 carbon atoms in the polymer, which may or may not be equal to the actual carbon-to-carbon double bond content, is calculated from the resulting data to determine the effective unsaturation level. The effective unsaturation level thus determined by analysis may be, for example, about 2–60 carbon-to-carbon double bonds per 1000 carbon atoms in the polymer. Polymers having effective unsaturation levels as determined by analysis of 7–30, and for better results 10–20, carbon-to-carbon double bonds per 1000 carbon atoms usually are preferred when preparing blends with highly unsaturated rubbers such as diene rubbers.

In instances where it is desired to prepare a tetrapolymer, or a polymer containing five or more different monomers, then one or more straight chain alpha-monoolefins containing 4–16 and preferably 4–10 carbon atoms should be substituted for an equal molar quantity of bound propylene in the above-mentioned polymer composition. For instance, the preferred range of the fourth monomer in tetrapolymers will usually be about 5–20 mol percent, but a smaller amount such as 1, 2, 3 or 4 mol percent may be used.

The polymerization solvent may be any suitable inert or saturated hydrocarbon which is liquid and relatively nonviscous under the reaction conditions, including the prior art solvents for the solution polymerization of monoolefins in the presence of Ziegler catalysts. Examples of satisfactory hydrocarbon solvents include open chain saturated hydrocarbons containing 5–8 carbon atoms, of which hexane is usually preferred; aromatic hydrocarbons and especially those containing a single benzene nucleus such as benzene, toluene, etc.; and saturated cyclic hydrocarbons which have boiling ranges approximating those for the open chain and aromatic hydrocarbons discussed above, and especially saturated cyclic hydrocarbons containing 5 or 6 carbon atoms in the ring. The solvent may be a mixture of one or more of the foregoing hydrocarbons, such as a mixture of aliphatic and naphthenic hydrocarbon isomers having approximately the same boiling range as normal hexane. The solvent should be dry and free of substances which will interfere with the Ziegler catalyst to be used in the polymerization step.

Catalysts in accordance with the prior art may be used in preparing the solution of polymer to be treated in accordance with the invention. In general, prior art Ziegler-type catalysts may be used which are known to produce a satisfactory elastomer. Examples of such catalysts are disclosed in a large number of issued patents, such as United States Pats. Nos. 2,933,480, 3,093,620, 3,093,621, 3,211,709 and 3,113,115. Examples of Ziegler catalysts include metal organic coordination catalysts prepared by contacting a compound of a metal of Groups IVa, Va, VIa and VIIa of the Mendeleeff Periodic Chart of the elements, as typified by titanium, vanadium and chromium halides, with an organo-metallic compound of a metal of Groups I, II or III of the Mendeleeff Periodic Chart which contains at least one carbon-metal bond, as typified by trialkyl aluminum and alkyl aluminum halides wherein the alkyl groups contain 1–20 and preferably 1–4 carbon atoms.

The preferred Ziegler catalyst for many polymerizations is prepared from a vanadium compound and an alkyl-aluminum halide. Examples of suitable vanadium compounds include vanadium trichloride, vanadium tetrachloride, vanadium oxychloride, vanadium acetylacetonate, etc. Activators which are especially preferred include the alkylaluminum chlorides of the general formulae $R_1AlCl_2$ and $R_2AlCl$, and the corresponding sesquichlorides of the general formula $R_3Al_2Cl_3$, where R is a methyl, ethyl, propyl, butyl or isobutyl radical. A catalyst prepared from methyl or ethyl aluminum sesquichloride and vanadium oxychloride is especially preferred, and when using this catalyst the optimum ratio of the catalyst components is usually one mol of vanadium oxychloride for each 4–10 mols of the alkylaluminum sesquichloride.

The present invention is especially useful in the preparation of sulfur-curable elastomers from monomeric mixtures including certain polyenes which have a pronounced tendency to cause molecular jump. Examples of such polyenes include the bridged ring polyenes disclosed in United States Pats. Nos. 3,093,620, 3,093,621 and 3,211,709, such as the 5-alkenyl-2-norbornenes and 5-alkylidene-2-norbornenes wherein the alkenyl group contains about 3–20 and preferably 3–8 carbon atoms and the alkylidene group contains about 1–20 and preferably 1–8 carbon atoms. Certain diolefins such as 5-methylene-2-norbornene, 5-ethylidene-2-norbornene, 5-isopropylidene-2-norbornene, dicyclopentadiene, and polyenes general which have strained or highly active unsaturation, exhibit a greater tendency to cause molecular jump and the invention is most useful when these monomers are preesnt in the monomeric mixture to be polymerized.

The foregoing detailed description and the following specific examples are for purposes of illustration only, and are not intended as being limiting to the spirit or scope of the appended claims.

EXAMPLE I

The reaction vessel employed in this example is a one-half gallon Sutherland reactor equipped with a high speed, heavy-duty, air driven motor, cooling coils, a thermometer, a temperature regulator, a pressure regulator, an injection port, and other openings where monomers, catalyst, and solvent are fed to the reactor. A tube dipping to the bottom of the reactor is present for the removal of the cement which is produced on a continuous basis. A vapor phase vent is provided to bleed off 15% of the gaseous monomer feed to prevent inert gas buildup.

The clean reactor is assembled, rinsed with dry hexane and purged overnight with dry nitrogen. On the next morning, the reactor bowl is heated with a flameless blowtorch and hot water is run through the coils until the temperature in the reactor is about 70° C. Propylene is flushed through the reactor for about 15 minutes, and the temperature is lowered to ambient. One liter of Esso chemical grade hexane, dried over 4A molecular sieves and stored over sodium, is added to the reactor. As the temperature is brought to 40° C., propylene is fed to the reactor through a 4A molecular sieve column until 42.5 inches of mercury is reached. The pressure is then brought up to 61.1 inches of mercury with ethylene fed through a 4A molecular sieve column and 2.8 millimoles (0.39 cc.) of pure 5-methylene-2-norbornene and 0.7 cc. of 1.5 M ethylaluminum sesquichloride are added.

The monomers are shut off and the catalyst components, i.e., 0.35 molar ethylaluminum sesquichloride and 0.036 molar vanadium oxytrichloride at a 12 to 1 aluminum to vanadium ratio are fed into the reactor at a constant rate until a drop in pressure in the reactor is noted. At this time, the gaseous monomers are fed into the reactor through suitably calibrated rotometers at a rate of 1456 cc./minute, which volume contains 692 cc. of ethylene and 764 cc. of propylene. The 5-methylene-2-norbornene is added as a 0.22 M solution in hexane at 1.23 cc./minute, and this amount provides about 2.3 weight percent for incorporation into polymer. The polymerization is controlled by the catalyst pumps which add catalyst on demand as the pressure increases, thus maintaining the 61.1 inches of mercury pressure throughout the run. When the solution is approximately 6% by weight polymer, solvent containing 16 cc./cc. ethylene is fed into the reactor at the rate of 28.0 cc./minute, and polymer cement is withdrawn which contains about 85 g. of polymer per hour. At this time, the ethylene and propylene feeds are adjusted to 312 cc./minute and 1704 cc./minute, respectively, to compensate for the unreacted monomers removed with the cement. The feed rate of the 5-methylene-2-norbornene solution is adjusted to 1.6 cc./minute.

The solution of polymer as removed from the reactor is fed without agitation into water to kill the active catalyst. The cement is then washed three times with equal volumes of water. The washed cement is fed with nitrogen pressure into a T joint at the bottom of a four-liter container full of hot circulating water. The other end of the T is connected to a steam line and steam is admitted at such a rate as to superheat the rubber cement. The solvent and unreacted monomers are mostly removed by this procedure. The rubber crumb is collected on a screen, washed and chopped up in a Waring Blendor. The rubber crumb is dried in the oven at 90° C. to remove any remaining solvent and water giving a rubbery copolymer which contains over 3% by weight of gel and has a reduced specific viscosity when 0.1 g. is dissolved in 100 cc. of Decalin of over 4.00 at 135° C. The polymer is crosslinked and is almost unprocessible.

EXAMPLE II

The procedure of Example I is repeated with the exception of admixing in the solution of polymer as removed from the reactor a dry hexane slurry containing 10 parts by weight of super-abrasion furnace black for each 100 parts of the polymer. Thereafter, the solution of polymer and carbon black suspension is fed into the water and washed, and the subsequent procedure is as noted in Example I. The resulting rubbery polymer contains no gel, it is not unduly crosslinked, and it is readily processible.

EXAMPLE III

The procedure of Example II is repeated with the exception of substituting an equimolar amount of 5-ethylidene-2-norbornene for the 5-methylene - 2 - norbornene. The resulting polymer has a Mooney value ($ML_4$) of 95–96, it is readily processible, and it contains no gel.

The elastomers described herein may be analyzed as set out below to determine the effective unsaturation level by the consumption of bromine correcting for the substitution reaction by a differential kinetic method based on the spectrophotometric method developed by Siggia et al., Anal. Chem. 35, 362 (1963). The basis of the method is the determination of the differences in rates of addition and substitution of bromine ($Br_2$) with ethylenically unsaturated linkages. The rate of reaction is determined by monitoring the disappearance of the bromine photometrically as a function of time. A sharp break occurs when the rapid addition reaction to the carbon-to-carbon double bonds is complete and the slow substitution reaction continues. Extrapolation of a kinetic plot (pseudo first order) to a time of "0" will give the amount of bromine remaining after addition to the carbon-to-carbon double bonds was complete. The change in bromine concentration is taken as the measure of the effective unsaturation level in the elastomer.

Materials (1) Bromine solution, 0.0125 molar in $CCl_4$ (2.0 g. of $Br_2$/liter of $CCl_4$).

(2) Aqueous potassium iodide solution containing 10 grams of KI in 100 ml. of water.

(3) Mercuric chloride catalyst solution containing 0.2 g. of mercuric chloride dissolved in 100 ml. of 1,2-dichloroethane.

(4) Starch indicator solution.

(5) Aqueous sodium thiosulfate solution, 0.01 Normal accurately standardized.

(6) Carbon tetrachloride, reagent grade.

(7) Spectrophotometer (visible range) having sample and reference cells that can be stoppered.

(8) Stopwatch (if a nonrecording photometer is used).

Calibration (1) With the standard 0.01 N $Na_2S_2O_3$ solution, titrate to the starch-iodine endpoint duplicate 10.00 ml. samples of the 0.0125 M bromine solution to which 5 ml. of the 10% KI solution and 25 ml. of distilled water have been added.

(2) From the standard 0.0125 M bromine solution, prepare a series of five calibration standards of the following concentrations: 0.5, 1, 2, 3, and 4 millimoles of $Br_2$/liter.

(3) Determine the absorbance in the sample cell of each of the five calibration standards at a wavelength setting of 415 m$\mu$ [1] versus $CCl_4$ in the reference cell. Then prepare a plot from the resulting data of absorbance versus the exact concentration of $Br_2$ contained in the calibration standards, plotted as millimoles of $Br_2$/liter, to obtain a calibration curve.

(4) Determine the slope of the calibration curve thus obtained for use in the equation:

$Br_2$ in millimoles/liter =

$$\text{Absorbance} \times \frac{1}{\text{slope of calibration curve}}$$

Analysis (1) Dissolve about 1.25 grams of the dry polymer to be analyzed in 50 ml. of $CCl_4$ (or take sufficient polymer cement to contain about 1.25 grams of the polymer). Precipitate the polymer by pouring the solution into 400 ml. of isopropyl alcohol with vigorous stirring provided by a Waring Blendor.

(2) Filter the precipitated polymer and squeeze out the excess liquid.

(3) Dissolve the once precipitated polymer from Step 2 in 50 ml. of $CCl_4$, precipitate the polymer again by pouring into 400 ml. of isopropyl alcohol as in Step 1, and filter and remove excess liquid as in Step 2.

(4) Immediately redissolve the twice precipitated undried polymer from Step 3 in about 50 ml. of $CCl_4$ in a Waring Blendor. Filter the solution through glass wool into a 2-ounce narrow-mouthed bottle that can be stoppered to prevent evaporation. Determine the solids content by evaporation of duplicate 5.0 ml. samples of the polymer solution. A hypodermic syringe is convenient for measuring the polymer solutions.

(5) Set the spectrophotometer at the wave-length of 415 m$\mu$.

(6) Check the concentration of the 0.0125 M bromine solution daily before use by determining the absorbance of a known dilution.

(7) To the sample photometer cell, add 1.00 ml. of the 0.2% $HgCl_2$ solution as a catalyst, and 1.00 ml. of the standard 0.0125 M solution of bromine in $CCl_4$.

(8) Prepare a polymer blank by adding to the reference cell 1.00 ml. of the polymer solution from Step 4, 1.00 ml. of $CCl_4$ and 1.00 ml. of the 0.2% $HgCl_2$ solution, shake well, and place the photometer reference cell in the instrument.

(9) Discharge 1.00 ml. of the polymer solution [2] into the photometer cell containing the catalyst and bromine solution from a hypodermic syringe starting the stopwatch the instant of mixing (or the recorder if a recording spectrophotometer is used). Stopper the cell and thoroughly agitate the mixture before placing the cell in the instrument.

(10) Record the 415 m$\mu$ wavelength absorbance of the mixture at one minute intervals. Continue recording time and absorbance values until the faster addition rate of bromine to the double bonds is complete and the slower substitution reaction is well defined. (Usually 10–15 minutes is sufficient.) Prepare a plot from the resulting data of absorbance versus time to obtain an absorbance curve for the analyzed sample.

Calculations (1) Extrapolate the linear portion of the absorbance curve (i.e., the portion for the substitution reaction) for the analyzed sample to zero time [3], and record the absorbance value for zero time.

(2) Determine the final $Br_2$ concentration by inserting the absorbance value at zero time which was obtained above, and the slope of the calibration curve, in the following equation. The final $Br_2$ concentration, which is the concentration of $Br_2$ at the end of the rapid addition reaction, is then calculated.

$$\text{Final Br}_2 \text{ concentration in millimoles/liter} = \text{Absorbance at zero time} \times \frac{1}{\text{slope of calibration curve}}$$

(3) Calculate the effective unsaturation level as carbon-to-carbon double bonds per 1000 carbon atoms in the polymer from the following equation:

$$\text{Effective unsaturation level expressed as carbon-to-carbon double bonds per 1000 carbon atoms in the polymer} = \frac{(A-B)(C)(14)(100)}{(1000)(D)(E)}$$

Where
A = initial $Br_2$ concentration, millimoles/liter
B = final $Br_2$ concentration, millimoles/liter
C = milliliters of solution in the sample photometer cell
D = percent solids of polymer in the polymer solution (based on the weight of the polymer in grams/volume of the solvent in milliliters)
E = milliliters of the polymer solution in the sample photometer cell.

What is claimed is:

1. In a process for preparing a sulfur-vulcanizable elastomer wherein a monomeric mixture containing ethylene, at least one alpha-monoolefin containing about 3–16 carbon atoms, and at least one ethylenically unsaturated monomer containing a plurality of carbon-to-carbon double bonds is interpolymerized in solution in an inert organic solvent in the presence of an active Ziegler polymerization catalyst to produce a solution of a sulfur-vulcanizable elastomer containing the active catalyst, the catalyst is deactivated, and thereafter the elastomer is recovered from the organic solvent solution, the elastomer being subject to molecular jump during the catalyst

---

[1] The spectrophotometer should be adjusted to the wavelength setting of maximum absorption since the bromine absorption curve is very sharp and even small errors in the wavelength setting cannot be tolerated.

[2] The sample size selected will permit analysis of polymers containing 1 to 5 $C = C/1000$ carbon atoms. Polymers with unsaturation levels above this range can be analyzed but the polymer concentration must be reduced proportionately.

[3] Extrapolation of the absorbance curve for the sample being analyzed gives essentially the same results as extrapolation of a kinetic plot but with a considerable saving in time.

deactivation step when the catalyst is deactivated by simple addition of water to the solution of elastomer, the improvement which comprises admixing carbon black with the organic solvent solution of the elastomer containing the active Ziegler catalyst before the addition of water to deactivate the catalyst, the carbon black being admixed with the solution of the elastomer in an amount corresponding to 1–200 parts by weight carbon black per 100 parts by weight elastomer, thereafter introducing water to kill the catalyst while molecular jump is suppressed by the previous introduction of the carbon black.

2. The process of claim 1 wherein the carbon black is admixed with the solution of elastomer in an amount to provide about 10–100 parts by weight of carbon black per 100 parts by weight of the elastomer.

3. The process of claim 1 wherein the elastomer contains about 20–80 mol percent of chemically bound ethylene, about 80–20 mol percent of chemically bound propylene, and a bridged ring compound containing a plurality of carbon-to-carbon double bonds is interpolymerized with the ethylene and propylene in an amount to provide an effective unsaturation level of about 2–60 double bonds per 1000 carbon atoms in the elastomer.

4. The process of claim 3 wherein the bridged ring compound is selected from the group consisting of 5-alkenyl-2-norbornenes wherein the alkenyl group contains about 3–20 carbon atoms and 5-alkylidene-2-norbonenes wherein the alkylidene group contains about 1–20 carbon atoms.

5. The process of claim 3 wherein the Ziegler catalyst is prepared from vanadium oxytrichloride and an alkylaluminum sesquichloride wherein the alkyl group contains about 1–4 carbon atoms, the polymer contains about 55–70 mol percent of bound ethylene and about 45–30 mol percent of bound propylene, and the bridged ring compound is selected from the group consisting of 5-methylene-2-norbornene, 5-ethylidene-2-norbornene, 5-isopropylidene-2-norbornene, and dicyclopentadiene.

6. The process of claim 5 wherein the bridged ring compound is 5-ethylidene-2-norbornene.

7. The process of claim 6 wherein about 10–100 parts by weight of carbon black for each 100 parts by weight of the elastomer is suspended in an additional portion of the said organic solvent which is substantially free of water, the resulting dry suspension of the carbon black is admixed with the solution of elastomer, subsequent thereto the solution of elastomer is washed with water to thereby suppress molecular jump while removing the catalyst residue, and thereafter the elastomer having a reduced catalyst residue content is recovered from the organic solvent.

References Cited
UNITED STATES PATENTS

| | | |
|---|---|---|
| 3,060,145 | 10/1962 | Moscrip. |
| 3,203,916 | 8/1965 | Voet. |
| 3,203,922 | 8/1965 | Hammer. |

MORRIS LIEBMAN, Primary Examiner

S. L. FOX, Assistant Examiner

U.S. Cl. X.R.
260—80.78